US007982753B2

(12) United States Patent
Ito et al.

(10) Patent No.: US 7,982,753 B2
(45) Date of Patent: Jul. 19, 2011

(54) INFORMATION DISPLAY APPARATUS

(75) Inventors: Junpei Ito, Tokyo (JP); Hiroki Kato, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 491 days.

(21) Appl. No.: 11/590,667

(22) Filed: Oct. 31, 2006

(65) Prior Publication Data

US 2007/0097116 A1    May 3, 2007

(30) Foreign Application Priority Data

Nov. 1, 2005    (JP) ................................. 2005-318360

(51) Int. Cl.
*G09G 5/00*    (2006.01)
*G06F 3/01*    (2006.01)

(52) U.S. Cl. .................... 345/662; 345/676; 715/702

(58) Field of Classification Search .............. 345/662, 345/676; 382/103
See application file for complete search history.

(56) References Cited

U.S. PATENT DOCUMENTS 5,539,427 A * 7/1996 Bricklin et al. ............... 345/622
6,023,275 A * 2/2000 Horvitz et al. ............... 715/700

FOREIGN PATENT DOCUMENTS

| JP | 9-259301 | 10/1997 |
|----|----------|---------|
| JP | 2004-78380 | 3/2004 |
| JP | 2004-280532 | 10/2004 |

OTHER PUBLICATIONS

G. A. Berry, V. Pavlovic and T. S. Huang, Battleview: A Multimodal HCI Research Application, Workshop on Perceptual User Interfaces, ACM 1998.*
C. W. Ng and S. Ranganath, Real-time Gesture Recognition System and Application, Elsevier 2002.*
S. Malik, J. Laszlo; Visual Touchpad: A Two-handed Gestural Input Device; ICMI'04, ACM, Oct. 2004.*
Notice of Rejection dated May 26, 2009, from the corresponding Japanese Application.

* cited by examiner

*Primary Examiner* — Kee M Tung
*Assistant Examiner* — Carlos Perromat
(74) *Attorney, Agent, or Firm* — Katten Muchin Rosenman LLP (57) ABSTRACT

An information display apparatus connected to a display unit for visually presenting information to a user is disclosed. The information display apparatus displays a frame within a display region of the display unit, information to be displayed in the frame, and an operation guide at the outer peripheral edge of the frame, and updates information displayed in the frame.

10 Claims, 6 Drawing Sheets

| MOVING DIRECTION | | OPERATIONS |
|---|---|---|
| LEFT HAND | RIGHT HAND | |
| RIGHT | RIGHT | LEFT SCROLL |
| LEFT | LEFT | RIGHT SCROLL |
| UPPER | UPPER | UP SCROLL |
| LOWER | LOWER | DOWN SCROLL |
| RIGHT | LEFT | SCALE DOWN |
| LEFT | RIGHT | SCALE UP |
| ⋮ | ⋮ | ⋮ |

USER'S VIEWPOINT POSITION

PICTURE DISPLAYED

INFORMATION DISPLAY APPARATUS

CROSS-REFERENCE TO RELATED APPLICATIONS

The priority application No. JP 2005-318360 upon which this patent application is based is hereby incorporated by reference.

BACKGROUND OF THE INVENTION

1. Field of the Invention

The present invention relates to an information display apparatus, including a home-use game machine, a personal computer and the like.

2. Related Arts

In recent games, a three-dimensional virtual space is set, and a position and a line-of-sight direction of a player are changed in the virtual space, whereby the display of objects (enemy character, game item, etc.) in the virtual space is controlled.

There is an approach of moving objects in the virtual space in such a manner that the line-of-sight direction is rotated to the left when the left button of a cross-shape key is depressed, and is moved upward when the upper button is depressed.

In the movement/line-of-sight direction operation using the cross-shape key, front/rear movement, vertical movement, and rotation movement are individually designated for the control. Accordingly, it is difficult for a beginner to intuitively operate.

Accordingly, an object of the present invention is to provide an information display apparatus which enables the user to intuitively operate in the movement/line-of-sight direction operation in a virtual space.

SUMMARY OF THE INVENTION

According to one aspect of the present invention, there is provided an information display apparatus comprising: a first device, connected to a display unit for visually presenting information to the user, for displaying a frame in a display region of the display unit, and an object in a virtual space defined by a viewpoint position and a field of vision, which are set in the frame; a second device for accepting an operation of moving or scaling up/scaling down at least the frame as an operation on the frame; and a third device for updating the display content of the object in the virtual space by controlling the viewpoint position or the field of vision according to the accepted operation on the frame.

DESCRIPTION OF THE PREFERRED EMBODIMENT

Figure 1:
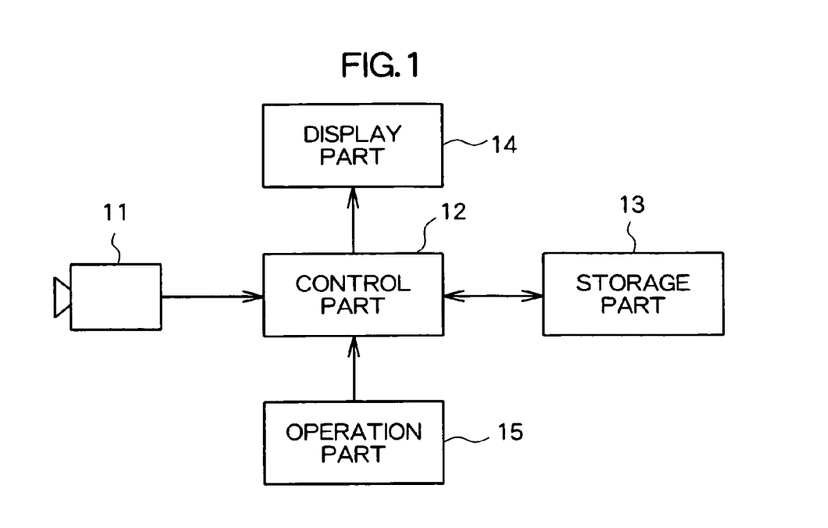
FIG. 1 is a block diagram showing a configuration of an information display apparatus according to an embodiment of the present invention.

The preferred embodiment of the present invention will be describe with reference to the accompanying drawings. An information display apparatus, which is an embodiment of the present invention, as shown in FIG. 1, includes an image pickup part 11, a controller part 12, a storage part 13, a display part 14, and an operation part 15, and is connected to a display unit, such as a display and a home-use television set.

The image pickup part 11 is a CCD camera, for example. The image pickup part 11 takes pictures of a user at predetermined intervals to produce still image data, and sequentially outputs the still image data to the controller part 12.

The controller part 12 is a CPU, for example, and operates according to a program stored in the storage part 13. The controller part 12 executes a process for identifying the data representing a gesture motion by a user from a sequence of still image data output from the image pickup part 11, and a process for displaying information in the display part 14 according to an instruction operation corresponding to the identified gesture motion. Details of the processes executed by the controller part 12 will be described in detail later.

The storage part 13 is a storage component, such as a RAM or a ROM, or a disk device, such as a hard disk or a DVD-ROM. The storage part 13 stores a program to be executed by the controller part 12, and also functions as a work memory of the controller part 12.

The display part 14 is, for example, a display controller. The display part stores display image data according to an instruction issued from the controller part 12, and outputs image signals to a display or a home-use television set as the display unit on the basis of the display image data. The operation part 15 is a game controller, a computer mouse, a keyboard or the like, and receives an instruction generated through a user's instruction operation, and outputs a signal based on the instruction operation to the controller part 12.

The controller part 12 in this embodiment operates to display images, documents and the like according to a user's instruction operation, and also to display a game screen. The controller part 12 operates to display a frame in a display region of the display unit, and to display an image of an object in a virtual space, which is an object to be displayed in the frame. If desired, image data gathered by the image pickup part 11 may be directly displayed as a background image outside the frame.

Figure 2A:
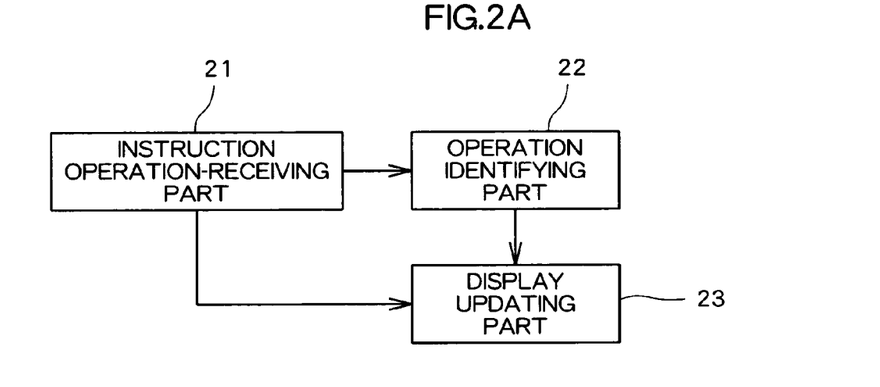
FIG. 2A is a functional block diagram showing a configuration of the information display apparatus of the embodiment.

The controller part 12 functionally includes an instruction operation-receiving part 21, an operation identifying part 22, and a display updating part 23, as shown in FIG. 2A.

The instruction operation-receiving part 21 outputs a sequence of still image data picked up by the image pickup part 11 to the display updating part 23, and causes the display unit to display it as a background of the frame. The instruction operation-receiving part 21 detects user's hands. To this end, what a designer has to do is to construct a process of recognizing a part of a predetermined color as the hand on the basis of the still image data sequentially input from the image pickup part 11. Alternatively, the sequentially input still image data are compared to detect a motion part, and the motion part is recognized as the hands. In a case where the hands are detected on the basis of the motion, as in the latter case, and when the user is moving both hands, a difference is detected in the regions corresponding to the hands, whereby hand regions are detected. In this case, when the user does not move their hands, the hand regions are not detected. The instruction operation-receiving part 21 outputs information representing the hand regions thus detected to the operation identifying part 22 and the display updating part 23.

Figure 3:
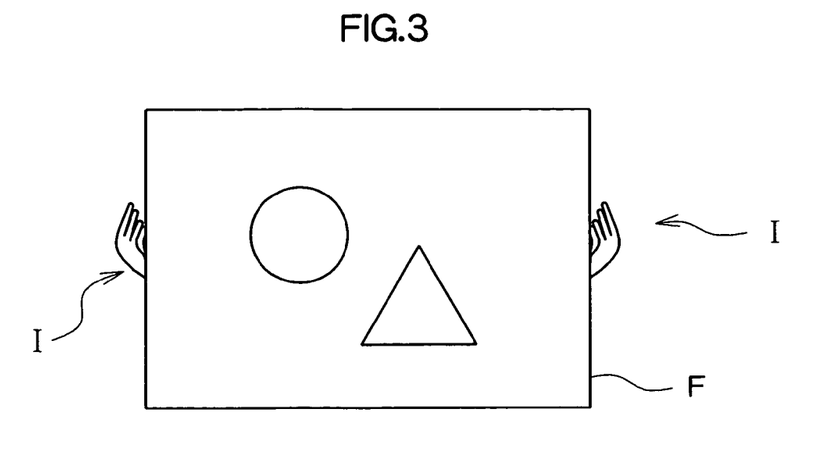
FIG. 3 is a diagram showing a display screen presented by the information display apparatus of the embodiment.

The operation identifying part 22 compares a display position of the frame with detected hand regions. If the barycenters of the regions of both hands of the user shift to within a predetermined reference region from the sides of the frame, the operation identifying part determines that the user has held the frame, and displays an operation guide along the peripheral edge parts of the frame (including the outside of the frame). The operation guide may be hand patterns holding the frame, as shown in FIG. 3. The operation guide may also be expressed by changing the attribute, for example, a color, of the contour line of the frame. In the case of FIG. 3, hand icons (I) are displayed at the peripheral edges of the frame (F). Part of each hand icon may be placed within the frame in FIG. 3.

Figure 4:
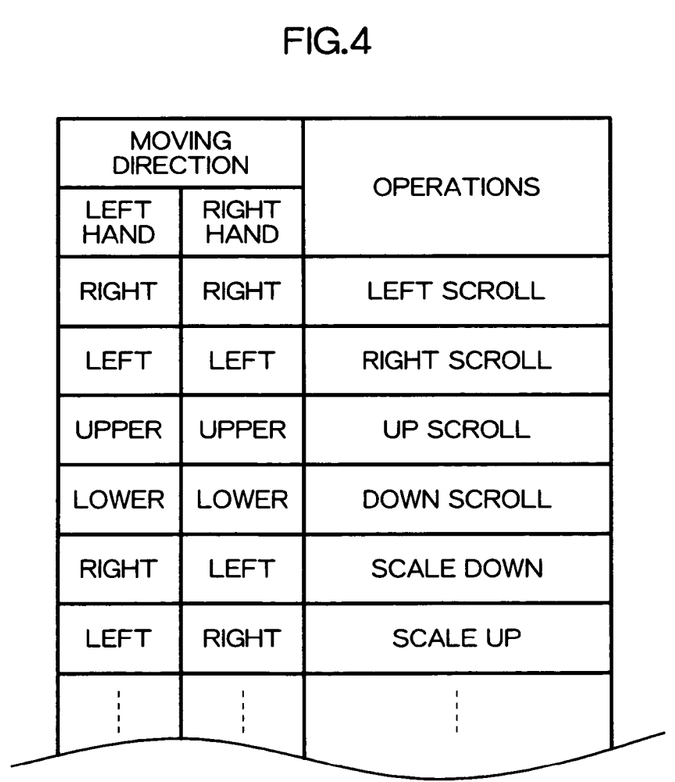
FIG. 4 is a diagram showing a table containing operation settings in the information display apparatus.

When determining that the frame has been held, the operation identifying part 22 identifies a motion of the user on the basis of a moving direction or areas of the hand regions, detected every time the image pickup part 11 picks up for gathering still image data, and referring to a setting table shown in FIG. 4, for example. In the setting table shown in FIG. 4, operations of the right and left hands are tabulated when the frame is moved in right and left, and upper and lower directions.

In the description given below, it is assumed that the user is present at a viewpoint position (coordinates U (Ux, Uy, Uz) in three-dimensions (3-D)). Further, the polar coordinates ($\gamma$, $\theta$, and $\phi$), the center of which is the user's viewpoint, are set up, a spherical surface of $\gamma=\gamma 0$ is a virtual screen, and an object in a three-dimensional virtual space is projected onto the screen. Such a method that projects an object onto the virtual screen to render the object is generally used. Accordingly, no further description of it is given here.

Figure 5:
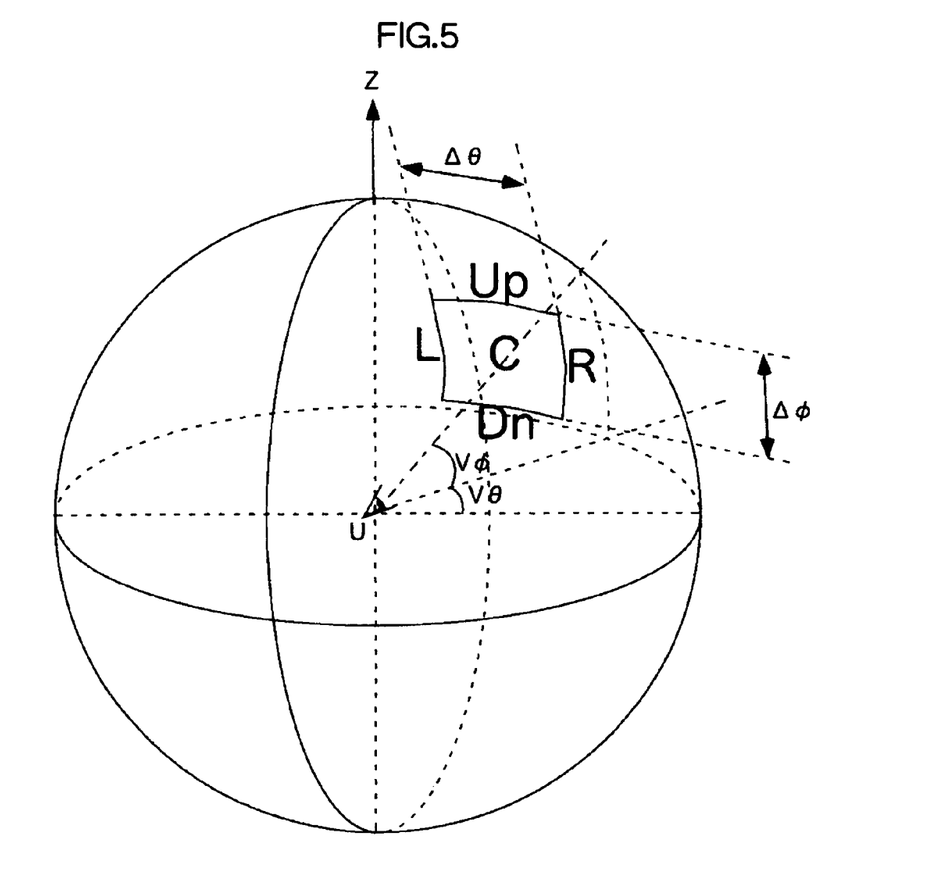
FIG. 5 is a diagram useful in explaining a virtual space for an object to be processed by the information display apparatus.

The controller part 12 stores a vector (V$\theta$, V$\phi$) representing a user's line-of-sight direction in the storage part 13. The controller part 12 further defines a range of vision S ($\Delta\theta$, $\Delta\phi$) as a part of the screen of which the center is at a point where a line-of-sight direction V originating from a viewpoint position U intersects with the screen. Further, the controller part 12 displays in the frame an image located within the range of vision S, which is one of the images to be virtually projected onto the screen, as illustrated in FIG. 5 by way of example. Accordingly, the movement of the frame in the up and down directions is equivalent to the frame movement in the direction $\phi$. The frame movement in the right and left directions is equivalent to the frame movement in the direction $\theta$.

In this instance, the frame is moved on the assumption that the right and the left hand regions are both in the same direction according to the contents of the setting table of FIG. 4. For example, the quantities of the movements of the barycenters of the right- and left-regions of the user's hands in the right and left directions (directions $\theta$) are compared with those of the movements thereof in the up and down directions (directions $\phi$) and the movement quantities which are the larger of the two are detected. When it is detected that the barycenters are both moving in the right direction (negative direction $\theta$), the operation identifying part 22 outputs a signal indicating that "right movement operation" has been performed. When it is detected that the barycenters are both moving in the up direction (positive direction $\phi$), the operation identifying part 22 outputs a signal indicating that "up movement operation" has been performed.

When the barycenters of both the hand regions move away from each other, and the movement quantity per unit time (distance between the barycenter point positions acquired from two successive still image data, for example) exceeds a predetermined threshold value, the operation identifying part 22 is allowed to determine that the end of the operation is instructed, and to output information indicative of "Operation End".

The display updating part 23 updates a frame display position displayed by the display part 14, and an image within the frame according to information representing the hand regions output from the instruction operation-receiving part 21, and the user's operation details output from the operation identifying part 22.

The display updating part 23 determines whether or not there is a "Movement Operation" in any of the up, down, right and left movements on the basis of the output signal from the operation identifying part 22. If the "movement operation" is performed, the display updating part 23 updates a frame display position according to information representative of the hand regions, which is output from the instruction operation-receiving part 21. For example, the display updating part 23 moves the frame in a movement direction output from the operation identifying part 22 so that the center of the frame is at the mid point between the barycenter positions of the right and left hand regions.

The display updating part 23 moves the range of vision of the image to be displayed in the frame in the frame moving direction during the time period that the frame display position is updated. For example, the display updating part 23 compares a center position CO of an image generated by the display part 14 with a center position FC of the frame. When a difference between the center position of display CO and the center position of frame FC exceeds a predetermined threshold value, the display updating part 23 moves the range of vision in the direction from the center position CO to the center position FC.

Figure 6:
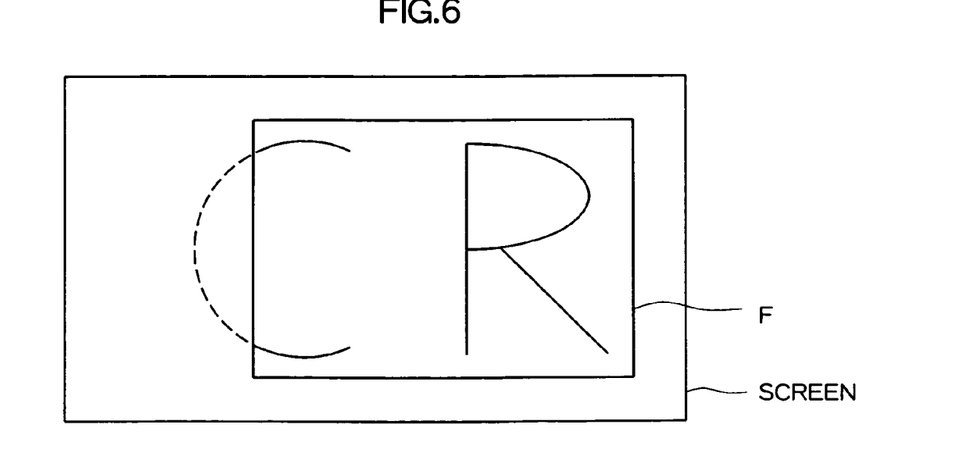
FIG. 6 is a diagram showing another display screen presented by the information display apparatus.

In an environment shown, by way of example, in FIG. 5, if a character "C" is first viewed in the frame, and the frame is moved from this position to the right, the frame moves to the right on the screen, and the range of vision displayed in the frame to the right (FIG. 6). As a result, the character "C" gradually disappears toward the left of the frame, and a character "R" gradually begins to appear from the right side (pan to the right).

When the frame is moved upward in a state where the character C is viewed, the character C disappears toward the bottom in the frame, while characters "UP" begin to appear from the top (to tilt in the up direction (in which $\phi$ increases)). The movement quantity of the range of vision within the frame may be defined as a variable of the movement quantity of the frame. If required, as the movement quantity of the center position FC of the frame from the center position CO increases, the movement quantity of the range of vision per unit time may be further increased. Irrespective of this movement quantity, the movement quantity of the range of vision per unit time may be fixed at a predetermined quantity.

When the operation identifying part 22 outputs information representing "Operation End", the display updating part 23 moves the frame so that the center of the frame is positioned at the center of an image generated by the display part 14.

While the movement operation of the frame has been described, the operation on the frame is not limited to the frame movement. In another possible operation on the frame, when the barycenters of the regions of both hands of the user move in different directions, as shown FIG. 4, the operation identifying part 22 determines that the frame has been scaled up or scaled down, and outputs information representing such a meaning.

In this case, the display updating part 23 determines whether or not "Scale down/Scale up Operation" is performed on the basis of the output signal from the operation identifying part 22. If the "Scale down/Scale up Operation" is performed, the display updating part 23 updates the display position of the frame on the basis of the information representing the hand regions output from the instruction operation-receiving part 21. The display updating part 23 detects the upper and lower frame line pair or the right and left frame line pair of which the center point is closest to the barycenters of the right and left hand regions. Also, a distance between the detected paired lines is set as a distance between the barycenters of the hand regions.

Figure 7A:
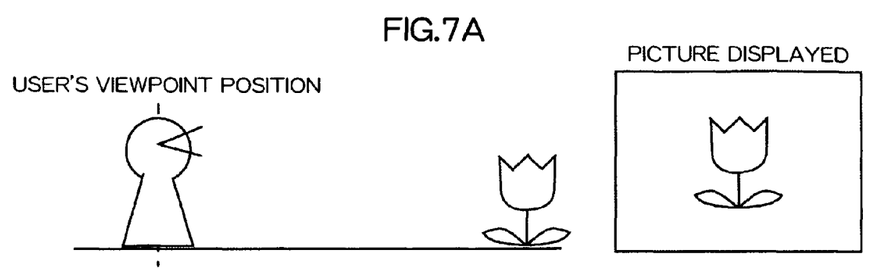
FIGS. 7A, 7B and 7C are diagrams useful in explaining a process for moving a viewpoint position in the information display apparatus.
Figure 7B:
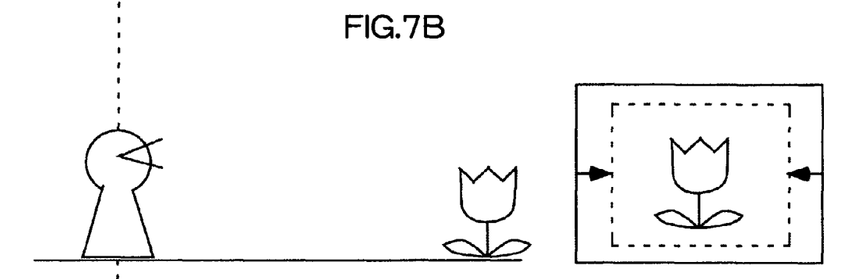
Figure 7C:
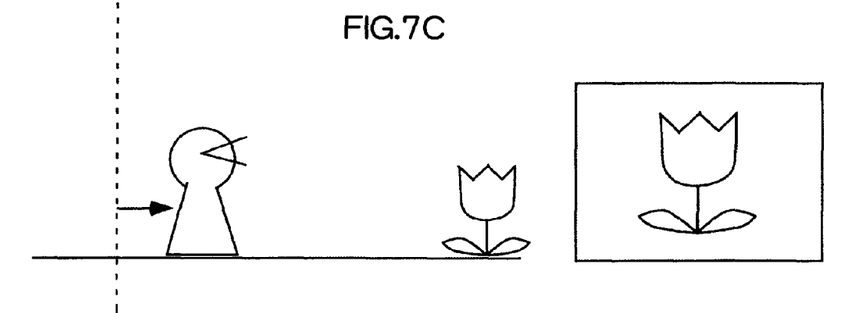

When the scale down/scale up operation is performed, the display updating part 23 may move the viewpoint position forward and backward to update the image within the frame, while it scales up/scales down the frame in the instance mentioned above. In this case, when a frame scaling down operation is performed in an initial state shown in FIG. 7A, the display updating part 23 scales down the frame in size and depicts an image (FIG. 7B). Then, when the user detaches their hands from the frame (the operation identifying part 22 outputs the information representing "Operation End"), the display updating part 23 moves the viewpoint position forward to the object (FIG. 7C) so that the frame resumes its original size, while maintaining a size ratio of the object displayed within the scaled down frame to the frame.

When the scale down/scale up operation is performed, the display updating part 23 divides a frame size after the scale down/scale up operation by a frame size before the scale down/scale up operation to thereby produce a scale down/scale up ratio η. The display updating part 23 also changes the viewpoint as expressed below according to the calculated scale down/scale up ratio η.

$$\begin{pmatrix} Ux \\ Uy \\ Uz \end{pmatrix}_n = \begin{pmatrix} Ux \\ Uy \\ Uz \end{pmatrix}_{n-1} + \sigma\alpha\eta \begin{pmatrix} \cos V_\theta \cos V_\phi \\ \sin V_\theta \cos V_\phi \\ \sin V_\phi \end{pmatrix} \quad (1)$$

In the above expression, σ determines a sign such that σ="−1" when η is 1 or larger, and σ="+1" when η is less than 1. α is a constant defining a movement quantity of the viewpoint to a variation of η. In the expression (1), the viewpoint position is moved in the line-of-sight direction by a distance based on the scale up/scale down rate. At this time, when the frame is scaled up, the viewpoint position is moved in the opposite direction to the line-of-sight direction, and when it is scaled down, it is moved in the line-of-sight direction (this is realized by changing the value of σ). In the expression (1), to discriminate between the viewpoints before and after it is updated, a subscript $U_n$ is attached to the viewpoint before it is updated, and $U_{n+1}$ is attached to the viewpoint after it is updated.

It suffices that which of the scaling down/scaling down operation of the frame or the forward/backward moving operation is performed is selected depending on a continuous time that the user's hand is located near the frame (operation by the user who is going to hold the frame). For example, during a time period when the scaling down/scaling up operation is performed (till the operation ends), a time when the displacement of barycenter of the hand regions does not exceed a predetermined quantity is measured, and until the measured time exceeds a predetermined operation threshold, the scaling down/scaling up operation is performed. The forward/backward moving operation is performed when the measured time exceeds the threshold value.

When the range of vision is changed, in place of the viewpoint position movement, for the scaling up/scaling down operation, what the display updating part 23 has to do is to update a quantity (Δθ☐Δφ☐defining the range of vision as expressed by the following equation according to the scale up/scale down rate of the frame.

$$\begin{pmatrix} \Delta\theta \\ \Delta\phi \end{pmatrix}_{n+1} = \eta \begin{pmatrix} \Delta\theta \\ \Delta\phi \end{pmatrix}_n \quad (2)$$

Also in this equation, to discriminate between the viewpoints before an after it is updated, a subscript $S_n$ is attached to the viewpoint before it is updated, and $S_{n+1}$ is attached to the viewpoint after it is updated.

While updating the image within the frame, the display updating part 23 may compose a portion to be displayed outside the frame on a background image (e.g., an image picked up by the image pickup part 11) using a translucent synthesizing method (synthesizing method for weight-adding the values of the pixels corresponding to the image data to be composed).

When the movement quantities of the barycenters of the regions of both hands of the user are each smaller than a predetermined movement threshold value, the operation identifying part 22 determines that natural camera-shake by the user has taken place, and stops the outputting of the information indicating that the movement operation or the scale down/scale up operation is performed. If so controlled, it is possible to prevent the display content being updated in response to a minute motion of the hand (motion of a camera-shaking level).

Description has thus far been given about the case where the region movement, such as the movement of the barycenters of the hand regions, is recognized as the operation by the user. When the hand is moved forward and backward, the hand region area becomes different. Accordingly, the operation identifying part 22 may recognize the user's operation by using the area change of the hand region.

Figure 8A:
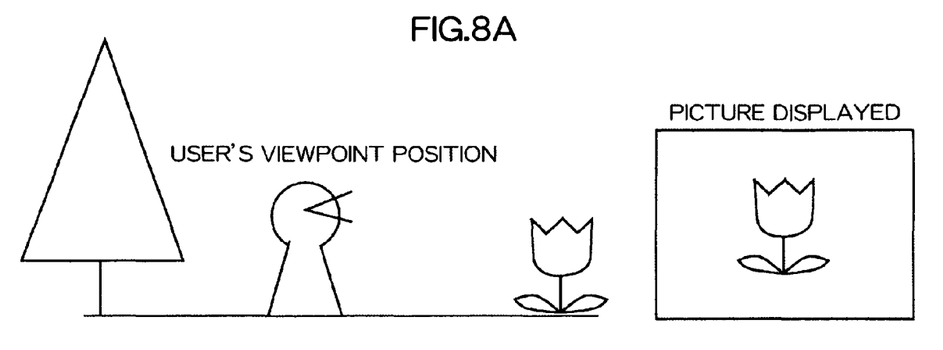
FIGS. 8A and 8B are diagrams useful in explaining a process for reversing a line-of-sight direction in the information display apparatus.
Figure 8B:
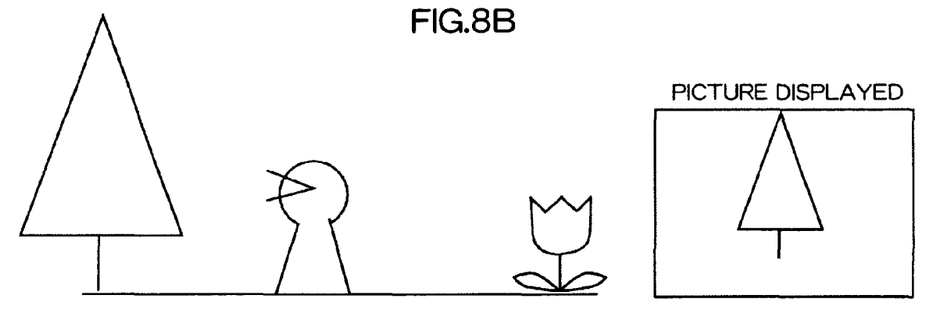

When the operation identifying part 22 determines that in a state where the user holds the right and left sides of the frame, one of those sides is moved to near side (the hand region area closer to one side decreases), and the other side of the frame is moved to the rear side (the hand region area closer to the other side decreases), the display updating part 23 adds 180° (π in radian) to Vθ as the line-of-sight direction vector component to reverse the line-of-sight direction, as in an example illustrated FIGS. 8A to FIG. 8B.

When a distance between the barycenters of the two hand regions is less than a predetermined threshold value, the operation identifying part 22 recognizes that distance as a "stop operation" and outputs information representing such a meaning. The display updating part 23 receives the information indicating that the stop operation has been performed, and stops the process of updating the information within the frame. The updating stop process may be a process to stop updating the information within the frame at a time point when the stop operation is performed, or a process to return the display content to the display content at a time point when it is determined that the user holds the frame. In this case, the controller part 12 has stored information about the display content at a time point when the user holds the frame (information of scroll position and frame size) in the storage part 13. Also, when the stop operation is performed, the controller part 12 changes the display content on the basis of the stored information. The result is that the operation to change the scroll and the frame size after the user holds the frame is cancelled.

Figure 2B:
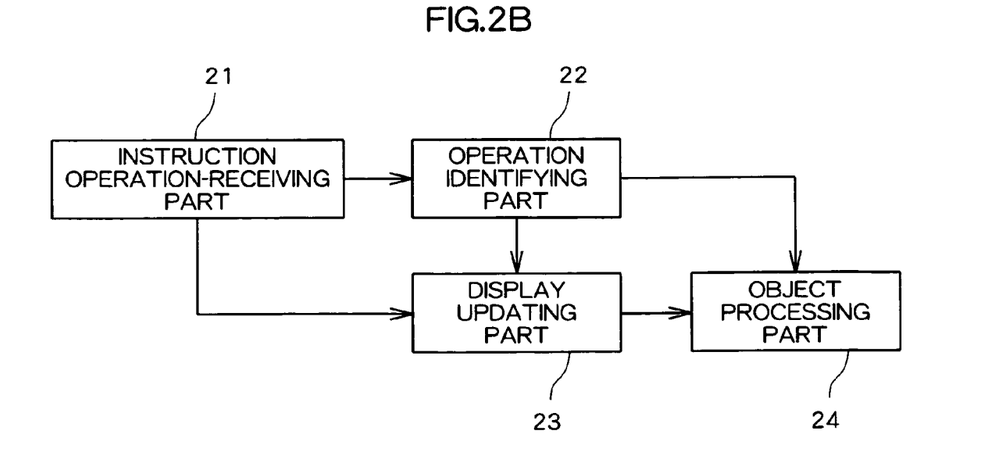
FIG. 2B is a functional block diagram showing another configuration of the information display apparatus of the embodiment.

In the description thus far given, such a user's operation that the user moves their right and left hands in directions where both hands approach each other in a state where it is determined that the frame has been held is recognized as the frame scale down operation. In an alternative, it may be recognized as an operation to select an object displayed within the frame. In this case, the controller part 12, as shown in FIG. 2B, includes the instruction operation-receiving part 21, the operation identifying part 22, the display updating part 23, and the object processing part 24.

The instruction operation-receiving part 21 and the operation identifying part 22 execute processes as already described. When the operation identifying part 22 detects that the barycenters of the regions of both hands of the user move towards each other, the display updating part 23 displays within the frame a second frame (the frame that had been originally displayed is referred to as a first frame, and a frame to be displayed by the operation is referred to as a second frame, for ease of explanation.), which is scaled up/scaled down according to the barycenters of the hand regions. The display updating part 23 changes at least one of the position and the size of the second frame according to the user's hand operation and displays the result.

An object processing part 24 outputs information specifying an object to be displayed within the second frame.

Figure 9:
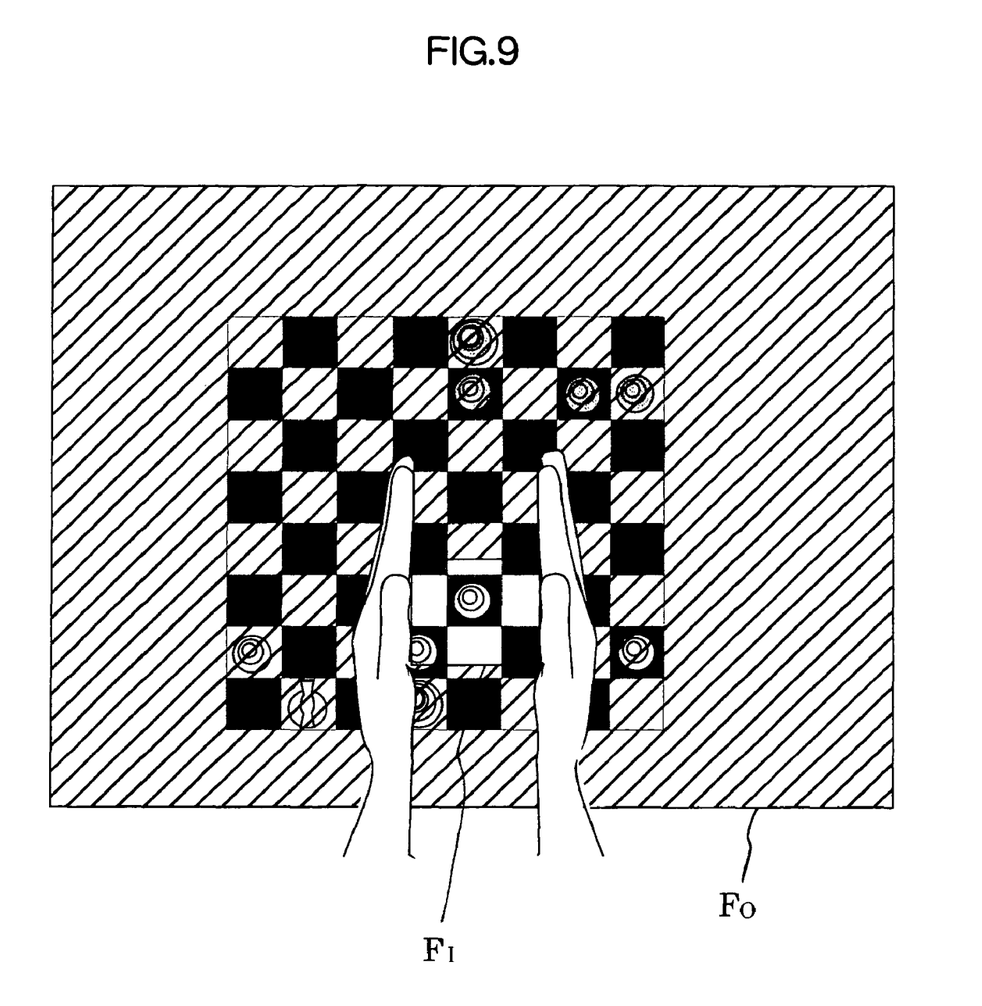
FIG. 9 is a diagram showing still another display screen presented by the information display apparatus.

In a specific example, an image representing a chessboard when it is viewed from above is displayed as shown in FIG. 9. In this state, when it is detected that the user has moved both hands from the first frame in a direction in which both the hands approach each other, the display updating part 23 displays a second frame Fi within a first frame Fo.

The display updating part 23 subsequently recognizes information of hand motion output from the operation identifying part 22 as an operation to the second frame Fi. Then, the second frame Fi is moved, in place of the first frame Fo, according to a motion of the user's hand, and is displayed in a scaled down/scaled up fashion. In other words, an area defined by the second frame Fi changes.

The controller part 12 also executes a process to display an object of a chessboard within the first frame Fo, as a process of a game application. The object processing part 24 outputs information for specifying an object contained in the second frame Fi, which is one of objects thus displayed. When a plurality of objects are contained in the second frame Fi, the object processing part 24 may output a list of information specifying those objects.

In processing the game application, the controller part 12 receives the information for specifying an object output from the object processing part 24, and when the number of the objects specified by the output information becomes one, the controller part 12 acquires the specified object as an object (marked object) to be operated, and provides it to a process to move a chess piece.

In displaying the second frame, it is not essential that the controller part 12 executes the process based on the operations, such as the scale down/scale up operation and the movement of the first frame.

Further, in the present embodiment, by detecting a side or sides of the frame being in contact with the hand regions, for example, by detecting whether or not the hand regions, shaped like an L (thumb is raised), are in contact with the four sides of a square frame, different operations may be assigned to the case where the hand regions are in contact with the four sides and the case where those are in contact with the opposed two sides, respectively.

In the description thus far given, motions of the user's hands are detected by using the image pickup part 11. In an alternative, the image within the frame may be translated or the frame may be scaled up/scaled down through the operation of the operation part 15, such as a game controller. In this case, the image pickup part 11 is not essential.

In the process thus far given, as shown in FIG. 5, a spherical screen is set within a virtual space, and when an object in the virtual space is projected onto the screen, variables in the coordinate system are used. The screen may be an X-Y coordinate plane of which the normal line is the line-of-sight direction vector.

The information display apparatus of the invention enables intuitive operation in the display region control. While the present invention has been described in terms of preferred or exemplary embodiments, it should be understood that the present invention is not limited to those embodiments.

What is claimed is:

1. A method for controlling an information display apparatus connected to a display unit for visually presenting information to a user, said method comprising:

displaying within a first display region of said display unit an object in a virtual space defined by a viewpoint position and a field of vision which are set in said virtual space;

displaying a frame with an original size whose original boundaries correspond with those of said first display region, wherein said display unit further comprises a second display region where an image data picked up by at least one image pickup device is displayed as a background image;

accepting at least an operation of varying a position or a size of said frame, wherein the frame boundaries define the boundaries between the first and second regions; and updating the display content in said frame by varying said viewpoint position or the field of vision according to an end of said accepted operation on said frame, wherein:

when said frame is scaled up or scaled down in response to said accepted operation on said frame, and after said operation is ended, said frame resumes its original size, and the viewpoint position moves according to the end of said accepted operation on said frame so that a size ratio of the object displayed within the scaled up or scaled down frame to the scaled up or scaled down frame is equivalent to a size ratio of the object displayed within the resumed original size frame to the resumed original size frame.

2. The method according to claim 1, wherein, in the step for updating the display content in said frame, computing a movement distance of a viewpoint position or a scale up or scale down rate of a range of vision on the basis of a scale up or scale down rate of said frame by said accepted operation, and updating a display content in said frame by varying said viewpoint position or said range of vision according to said computed movement distance or scale up or scale down rate.

3. The method according to claim 1, wherein said frame is a first frame, further comprising a step for displaying a second frame within said first frame displayed on said display unit, and a step for varying an area defined by said second frame according to an operation of varying the position or the size of said second frame in said first display region by the user.

4. The method according to claim 3, further comprising a step for selecting an object in said virtual space as a marked object by the operation on said second frame, said object within said virtual space, which is selected as said marked object, being subjected to a predetermined process.

5. The method according to claim 1, further comprising a step for stopping the process for updating the display content within said frame in execution in response to a predetermined stop operation by the user.

6. The method according to claim 1, further comprising a step for changing the position or the size of said frame in said display region to a predetermined position or size in response to a predetermined end operation by the user.

7. The method according to claim 6, further comprising a step for changing said viewpoint position according to the change of the position or the size of said frame in response to a predetermined end operation by the user.

8. The method of claim 1, wherein the operation on said frame is specified on the basis of images taken by the at least one image pickup device.

9. A non-transitory computer-readable recording medium for storing a program causing a computer, connected to a display unit for visually presenting information to a user, to execute the steps of:
  displaying within a first display region of said display unit an object in a virtual space defined by a viewpoint position and a field of vision which are set in said virtual space;
  displaying a frame with an original size whose original boundaries correspond with those of said first display region, wherein said display unit further comprises a second display region where an image data picked up by at least one image pickup device is displayed as a background image;
  accepting at least an operation of varying a position or a size of said frame, wherein the frame boundaries define the boundaries between the first and second regions; and
  updating the display content in said frame by varying said viewpoint position or the field of vision according to an end of said accepted operation on said frame, wherein:
  when said frame is scaled up or scaled down in response to said accepted operation on said frame, and after said operation is ended, said frame resumes its original size, and the viewpoint position moves according to the end of said accepted operation on said frame so that a size ratio of the object displayed within the scaled up or scaled down frame to the scaled up or scaled down frame is equivalent to a size ratio of the object displayed within the resumed original size frame to the resumed original size frame.

10. An information display apparatus connected to a display unit for visually presenting information to a user, said apparatus comprising:
  a first device for displaying within a first display region of said display unit an object in a virtual space defined by a viewpoint position and a field of vision which are set in said virtual space; the first device also displaying a frame with an original size whose original boundaries correspond with those of said first display region, wherein said display unit further comprises a second display region where an image data picked up by at least one image pickup device is displayed as a background image;
  a second device for accepting at least an operation of varying a position or a size of said frame, wherein the frame boundaries define the boundaries between the first and second regions; and
  a third device for updating the display content in said frame by varying said viewpoint position or the field of vision according to an end of said accepted operation on said frame, wherein:
  when said frame is scaled up or scaled down in response to said accepted operation on said frame, and after said operation is ended, said frame resumes its original size, and the viewpoint position moves according to the end of said accepted operation on said frame so that a size ratio of the object displayed within the scaled up or scaled down frame to the scaled up or scaled down frame is equivalent to a size ratio of the object displayed within the resumed original size frame to the resumed original size frame.

* * * * *